No. 773,434. PATENTED OCT. 25, 1904.
M. H. STERLING.
GATE.
APPLICATION FILED DEC. 21, 1903.
NO MODEL. 2 SHEETS—SHEET 2.
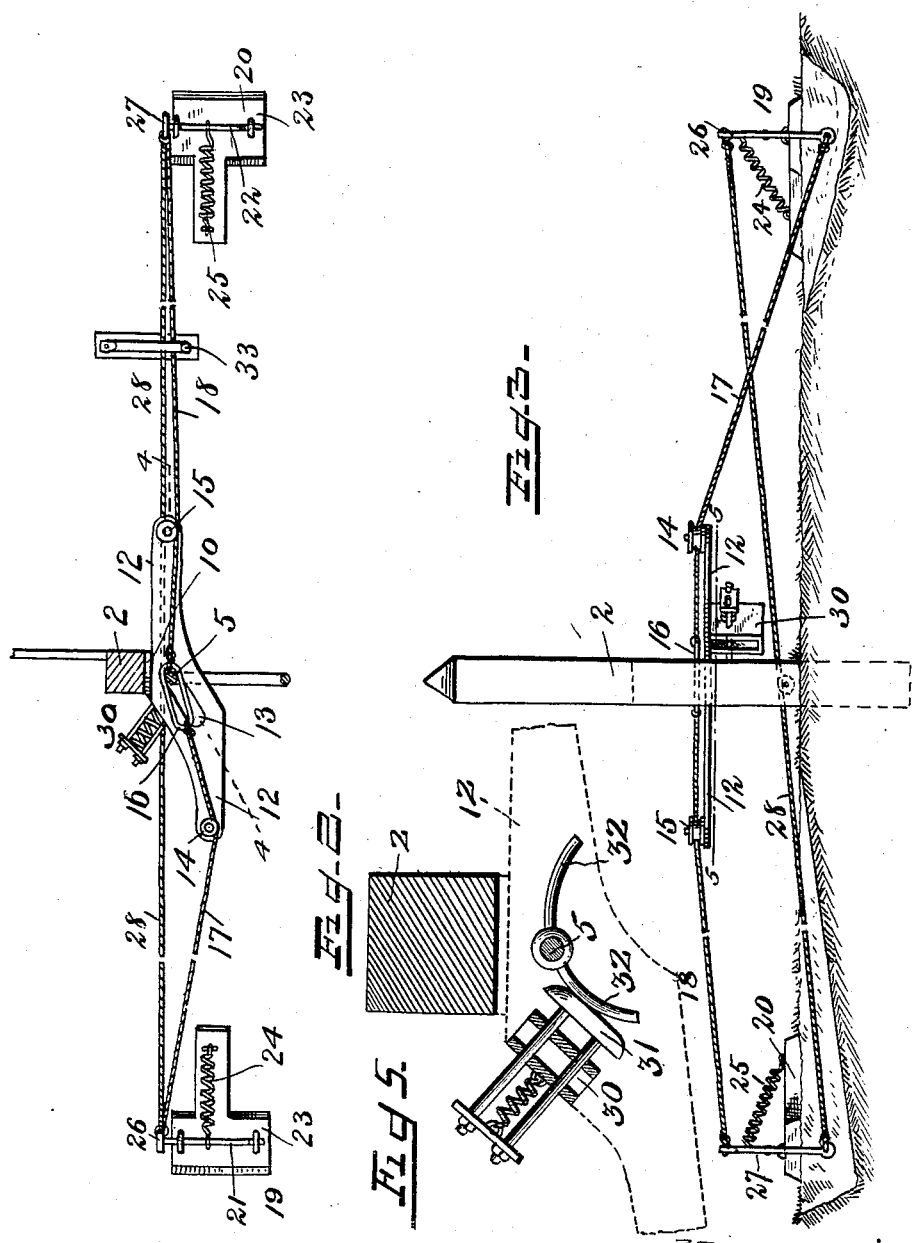
Witnesses
F. L. Durand
O. Willson
Inventor
M. H. Sterling
By H. R. Wilson
Attorney No. 773,434.  Patented October 25, 1904.

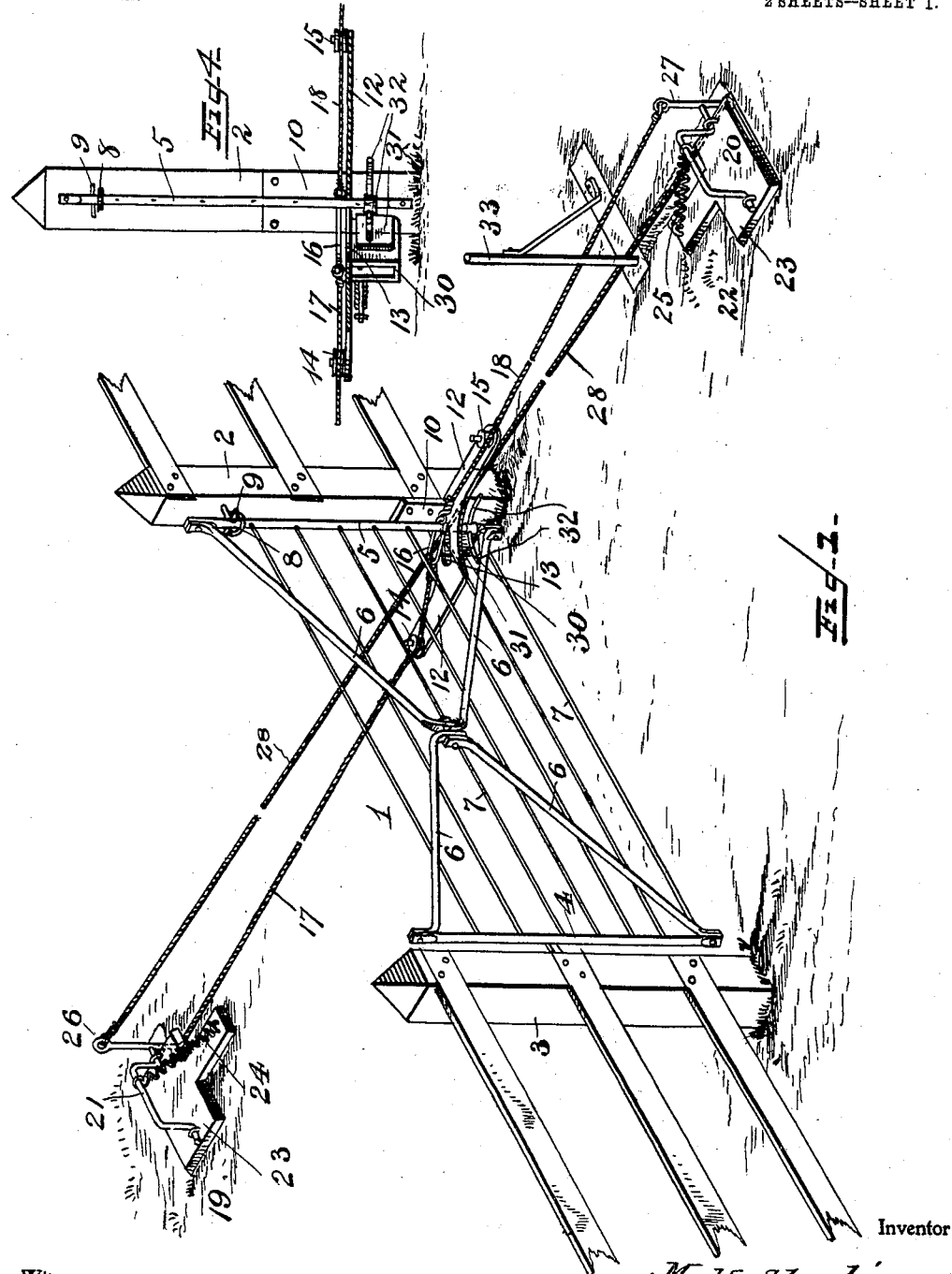

UNITED STATES PATENT OFFICE.

MARK HOWARD STERLING, OF DENVER, COLORADO.

GATE.

SPECIFICATION forming part of Letters Patent No. 773,434, dated October 25, 1904.

Application filed December 21, 1903. Serial No. 186,092. (No model.)

*To all whom it may concern:*

Be it known that I, MARK HOWARD STERLING, a citizen of the United States, residing in the city and county of Denver and State of Colorado, have invented certain new and useful Improvements in Gates; and I do declare the following to be a full, clear, and exact description of the invention, such as will enable others skilled in the art to which it appertains to make and use the same.

This invention relates to improvements in gates.

The object of the invention is to provide a gate having means whereby the same may be automatically opened and closed by the wheels of a vehicle when approaching from either direction.

A further object is to provide a gate of this character the operating mechanism of which is simple in construction, strong and durable, efficient in action, and comparatively inexpensive.

With these and other objects in view the invention consists of certain novel features of construction, combination, and arrangement of parts, as will be more fully described, and particularly pointed out in the appended claims.

In the accompanying drawings, Figure 1 is a perspective view of the gate in closed position. Fig. 2 is a horizontal sectional view of the same. Fig. 3 is a rear view of the operating mechanism. Fig. 4 is a vertical sectional view on the line 4 4 of Fig. 2. Fig. 5 is a detail sectional view taken on the plane indicated by the line 5 5 of Fig. 3 looking downwardly and showing the outline of the plate 12 in dotted lines.

Referring more particularly to the drawings, 1 denotes the gate.

2 denotes the hinge-post, and 3 the latch-post.

The gate may be of any suitable construction, but is here shown as formed of a frame comprising vertically-disposed end bars 4 and 5, which are supported and braced by two pairs of diagonally-arranged brace-bars 6, which are removably secured to the upper and lower ends of the bars 4 and 5. Between said end bars 4 and 5 are arranged horizontally-disposed members, which may be in the form of wire rods 7, as shown, or of any other suitable construction.

The gate may be pivotally connected at its upper end to the hinge-post 2 in any suitable manner, but is here shown as connected by securing to said post an eyebolt 8, with which the inner gate-bar 5 is loosely engaged. A pin 9 is inserted through the bar 5 and engages the upper side of the eyebolt and supports the gate in position and permits the same to have a slight tilting movement.

The lower end of the gate is connected to the hinge-post by a bracket 10, which projects from and is secured to said post. The bracket 10 is provided with a horizontally-disposed plate 12, in which is formed an obliquely-arranged cam-slot 13, through which projects the bar 5 of the gate, which permits the lower inner end of the gate to swing in the direction of the slot for a purpose hereinafter to be described. The plate 12 of the bracket 10 is extended in opposite directions to form obliquely-arranged arms, on the ends of which are journaled guide-pulleys 14 and 15.

Arranged around the bar 5 and resting on the plate 10 is an elliptical-shaped loop or band 16, to the opposite ends of which are connected the inner ends of operating cords or chains or cables 17 and 18, the opposite ends of which are connected to operating devices 19 and 20, arranged along the road at suitable distances from the gate. The operating devices 19 and 20 consist of angular bail-shaped crank-rods 21 and 22, the ends of which are pivotally connected to blocks or posts 23, set into the ground. Springs 24 and 25 are connected to the rods 21 and 22 to restore them to their normal positions after being actuated to open or close the gate. On one end of the crank-rods 21 and 22 are formed or fixed crank-levers 26 and 27. To the lower end of the crank-lever 26 is connected the outer end of the operating-cord 17, while the outer end of the cord 18 is connected to the upper end of the crank-lever 27. The lower end of the lever 27 is connected to the upper end of the lever 26 by a connecting cord, chain, or cable 28.

On the lower side of the bracket-plate 10 is arranged a depending arm or lug 30, in which is slidably supported a spring buffer-head 31, and near the lower end of the gate-bar 5 are fixed laterally-projecting arms 32, which are adapted to be engaged by said buffer-head to hold the bar 5 of the gate in position in the end of the slot after the cranks 21 or 22 have been actuated by the wheel of a vehicle and until the gate is entirely open or closed.

When in closed position, the bar 5 of the gate 1 occupies a position at the end of the slot 13 in the plate 10 nearest the hinge-post, and the loop or band 16 is drawn into engagement with the same by the cord 17. Should a vehicle approach the gate from the side on which the operating device 19 is arranged, the wheels of the vehicle will engage said operating device and rock the same and the crank-lever 26 forwardly, which would pull upon the cord 17 and the ring or band 16 and draw the gate-bar 5 to the opposite end of the slot, which, owing to the diagonal arrangement of the same, would throw the forward end of the gate upwardly and cause the same to swing back into open position. After passing through the gate the vehicle-wheels would engage the operating device 20 and rock the same, which would cause the lever 27 to pull upon the cord 18 and the band 16, thereby drawing the gate-bar 5 back again to its former position, which action causes the gate to swing upon the upper pivotal connection to close the same. A vehicle approaching from the direction of the operating device 20 will engage and rock the same and the lever 27, which through the connecting cord or cable 28 will impart motion to the lever 26 and cause said lever to open the gate in the same manner as previously described. After the vehicle passes through the gate in this direction the wheels of the same engage and rock the operating device 19 and lever 26, which action will impart movement to the lever 27 through the cord 28 and cause the same to close the gate, as hereinbefore described. Thus it will be seen that the operating device 19 acts directly upon the gate to open the same, while the operating device 20 acts to close the same, it being understood that the gate always swings in the same direction to open.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. In a gate, the combination with a hinge-post having an upper gate-supporting element, of a bracket-plate secured to said post and having a cam-slot engaged by the lower inner end of said gate, a loop or band arranged upon said plate to engage said end of the gate, operating-cables connected to said loop or band, operating devices attached to said cables whereby the same are drawn to automatically open and close said gate, a spring buffer-head slidably connected to said plate, and devices, with which the gate is provided, coacting with said buffer-head, for the purpose set forth, substantially as described.

2. In a gate, the combination with a hinge-post having an upper gate-supporting element, of a bracket-plate secured to said post, a cam-slot formed in said plate to engage the lower inner end of said gate, a loop or band arranged upon said plate to engage said end of the gate, operating-cables connected to said loop or band, crank-arms adapted to be engaged and rocked by a vehicle-wheel, crank-levers secured to said crank-arms, the ends of said levers being connected to said operating-cables whereby upon the rocking of said crank-arms said cables will be pulled to open or close said gate, substantially as described.

In testimony whereof I have hereunto set my hand in presence of two subscribing witnesses.

MARK HOWARD STERLING.

Witnesses:
GRANVILLE I. CHITTENDEN,
E. T. JONES.